(12) United States Patent
Silverman et al.

(10) Patent No.: US 8,799,219 B2
(45) Date of Patent: Aug. 5, 2014

(54) SELECTION OF MEDIA CONTENT ITEM HAVING PREFERRED INSTANCE ATTRIBUTES

(75) Inventors: Andrew L. Silverman, Redmond, WA (US); Shane McRoberts, Seattle, WA (US); John Zybura, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/268,874

(22) Filed: Nov. 11, 2008

(65) Prior Publication Data

US 2010/0121815 A1 May 13, 2010

(51) Int. Cl.
*G06F 17/30* (2006.01)

(52) U.S. Cl.
USPC .......................................... 707/621; 707/913

(58) Field of Classification Search
None
See application file for complete search history.

(56) References Cited

U.S. PATENT DOCUMENTS

| | | | |
|---|---|---|---|
| 6,473,763 B1 * | 10/2002 | Corl et al. ............................... 1/1 |
| 6,694,335 B1 * | 2/2004 | Hopmann et al. ............. 707/624 |
| 7,421,305 B2 * | 9/2008 | Burges et al. .................... 700/94 |
| 7,647,346 B2 * | 1/2010 | Silverman et al. ...... 707/999.107 |
| 8,185,495 B2 * | 5/2012 | Clark et al. .................... 707/610 |
| 2005/0091275 A1 * | 4/2005 | Burges et al. .............. 707/104.1 |
| 2006/0018270 A1 * | 1/2006 | Forand et al. .................. 370/324 |
| 2006/0041893 A1 | 2/2006 | Castro et al. |
| 2006/0100978 A1 | 5/2006 | Heller et al. |
| 2006/0190413 A1 * | 8/2006 | Harper ............................ 705/65 |
| 2006/0224620 A1 * | 10/2006 | Silverman et al. ......... 707/104.1 |
| 2007/0083556 A1 * | 4/2007 | Plastina et al. ............. 707/104.1 |
| 2007/0206247 A1 | 9/2007 | Kaplan |
| 2007/0226238 A1 * | 9/2007 | Kiilerich et al. .............. 707/101 |
| 2007/0239849 A1 | 10/2007 | Robbin et al. |
| 2008/0086494 A1 | 4/2008 | Heller et al. |
| 2008/0109492 A1 | 5/2008 | Koo |
| 2008/0133376 A1 * | 6/2008 | Hill ................................ 705/26 |
| 2008/0168526 A1 * | 7/2008 | Robbin et al. ................. 725/139 |
| 2008/0222126 A1 * | 9/2008 | To .................................... 707/5 |
| 2009/0196179 A1 * | 8/2009 | Clark et al. ................... 370/235 |

OTHER PUBLICATIONS

Oriovolution.org, Forum, http://www.riovolution.org/thread/526, Mar. 17, 2007, 11:58 posting of Peregrine, "I'd like to be able to delete by GENRE."*

"About Playlist Synchronization", Retrieved on Sep. 2, 2008, Webpage available at :- http://msdn.microsoft.com/en-us/library/bb248294(VS.85).aspx.

"What Information Does Windows Media Player Exchange or Store during Sync?", Retrieved on Sep. 2, 2008, Webpage available at :- https://windowshelp.microsoft.com/Windows/en-US/Help/6056f302-58df-4148-94a6-223330a52d981033.mspx.

* cited by examiner

*Primary Examiner* — Richard Bowen
(74) *Attorney, Agent, or Firm* — Micah Goldsmith; Glen Johnson; Micky Minhas

(57) ABSTRACT

The selection of a media content item having preferred instance attributes includes finding a preferred instance of a media content item having two or more different instances by recognizing a first instance of the media content item having a first set of instance attributes and recognizing a second instance of the media content item having a second set of instance attributes. The selection of a media content item having preferred instance attributes further includes selecting either the first instance of the media content item or the second instance of the media content item based on differences between the first set of instance attributes and the second set of instance attributes.

12 Claims, 6 Drawing Sheets

FIG. 3

POSSIBLE INSTANCE ATTRIBUTES:

| COLUMN 42 | FIRST INSTANCE OF MEDIA CONTENT ITEM | | | SECOND INSTANCE OF MEDIA CONTENT ITEM — 40 |
|---|---|---|---|---|
| ATT. 1 | ATT. 2 | ATT. 3 | ATT. 4 | |
| FALSE, | FALSE, | FALSE, | FALSE, | ATT. 1 |
| TRUE, | FALSE, | FALSE, | FALSE, | ATT. 2 |
| TRUE, | TRUE, | FALSE, | FALSE, | ATT. 3  ROW 44 |
| TRUE, | TRUE, | TRUE, | FALSE, | ATT. 4 |

POSSIBLE INSTANCE ATTRIBUTES:

FIRST INSTANCE OF AUDIO TRACK — 50

| CLEAR | PROTECTED | SECOND INSTANCE OF AUDIO TRACK |
|---|---|---|
| FALSE, | FALSE, | CLEAR |
| TRUE, | FALSE, | PROTECTED ← 56 |

POSSIBLE INSTANCE ATTRIBUTES:

FIRST INSTANCE OF MEDIA CONTENT ITEM — 60

| ATT. 1, 2, 3 | ATT. 1, 4 | SECOND INSTANCE OF MEDIA CONTENT ITEM |
|---|---|---|
| FALSE, | FALSE, | ATT. 1, 2, 3 |
| TRUE, | FALSE, | ATT. 1, 4 ← 64 |

POSSIBLE INSTANCE ATTRIBUTES:

FIRST INSTANCE OF AUDIO TRACK

| PROTECTED, FULL-LENGTH | CLEAR, CLIP | SECOND INSTANCE OF AUDIO TRACK |
|---|---|---|
| FALSE, | FALSE, | PROTECTED, FULL-LENGTH |
| TRUE, | FALSE, | CLEAR, CLIP |

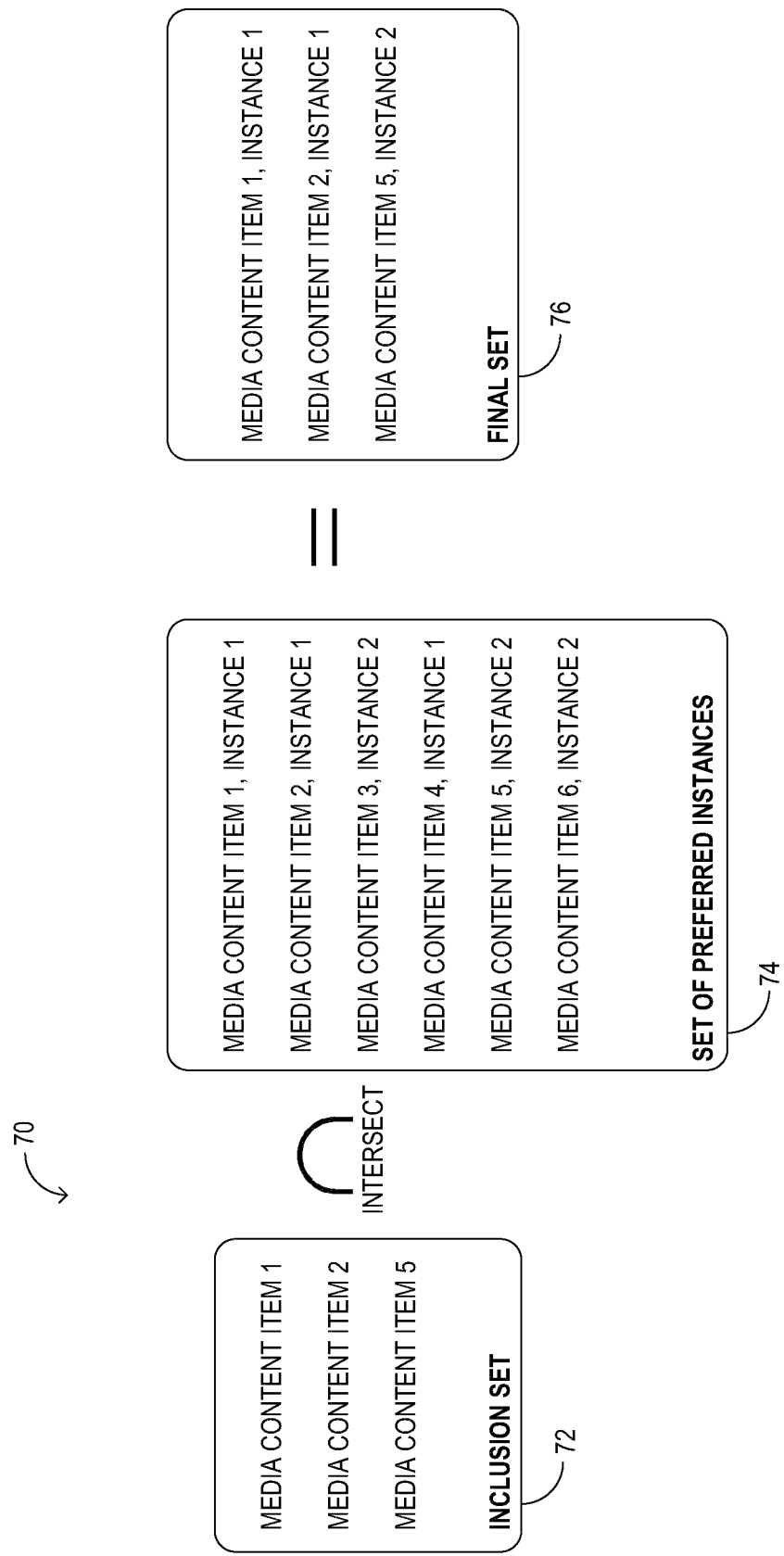

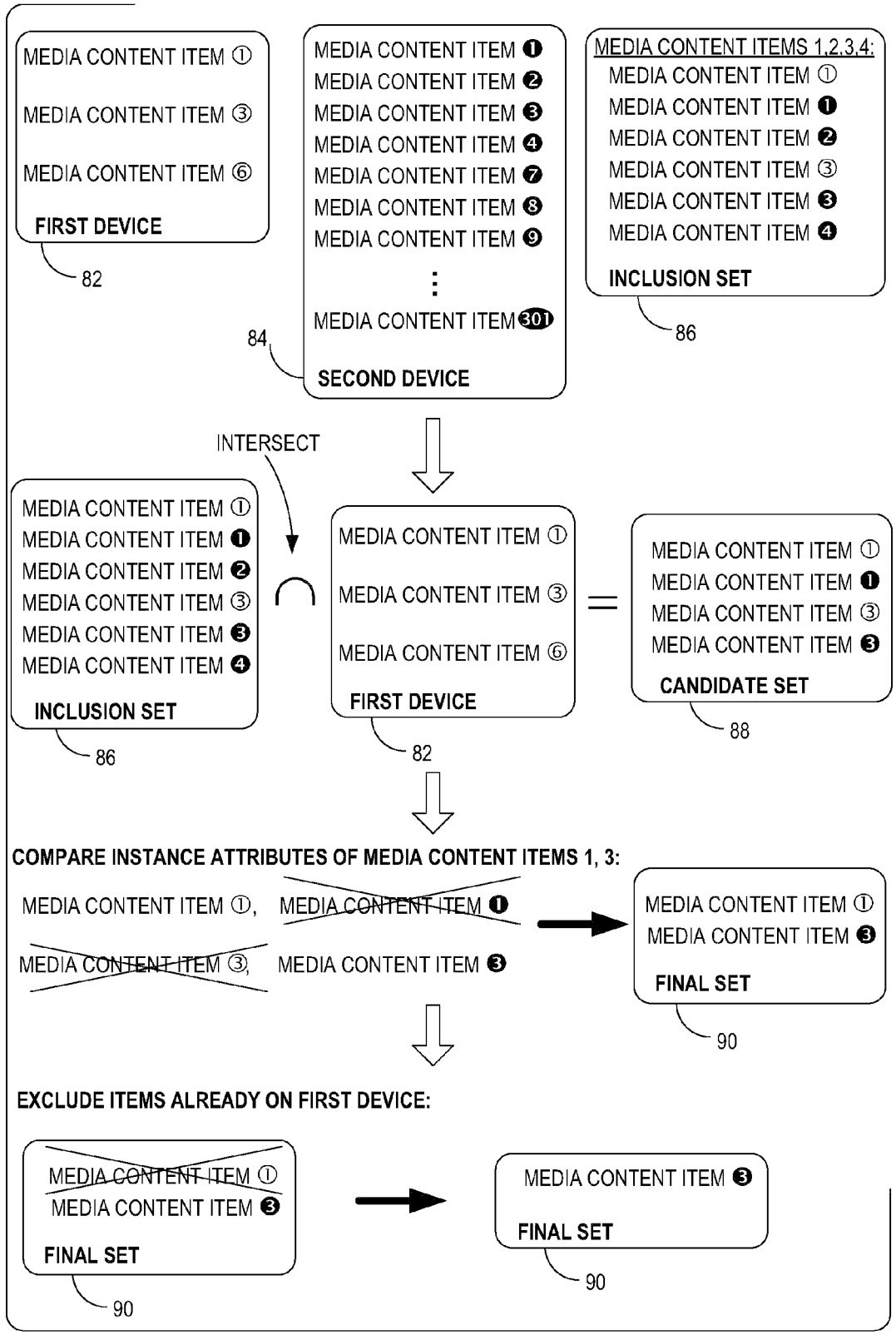

SELECTION OF MEDIA CONTENT ITEM HAVING PREFERRED INSTANCE ATTRIBUTES

BACKGROUND

A portable media device may be used to store, download, organize, and play media content items such as songs, movies, and games. Such portable media devices may download content from a content library such as a personal computer, a network-accessible content server, and/or another portable media device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments related to the selection of a media content item having preferred instance attributes are discussed herein. One disclosed embodiment includes finding a preferred instance of a media content item having two or more different instances by recognizing a first instance of the media content item having a first set of instance attributes and recognizing a second instance of the media content item having a second set of instance attributes. The embodiment further includes selecting either the first instance of the media content item or the second instance of the media content item based on differences between the first set of instance attributes and the second set of instance attributes.

BRIEF DESCRIPTION OF THE DRAWINGS

FIG. 3 shows an exemplary matrix configuration for selecting a first instance of a media content item over a second instance of that same media content item.

FIG. 4 shows an exemplary matrix configuration for selecting a clear audio track over a protected instance of that same audio track.

FIG. 5 shows an exemplary matrix configuration for selecting a first instance of a media content item over a second instance of that same media content item, where each instance has a different combination of instance attributes.

FIG. 6 shows an exemplary matrix configuration for selecting a protected, full-length audio track over a clear clip instance of that same audio track.

FIG. 7 shows a graphical depiction of a construction of a final set from the intersection of an inclusion set and a set of preferred instances.

FIG. 8 shows a graphical depiction of a construction of a candidate set and a construction of a final set.

DETAILED DESCRIPTION

Figure 1A:
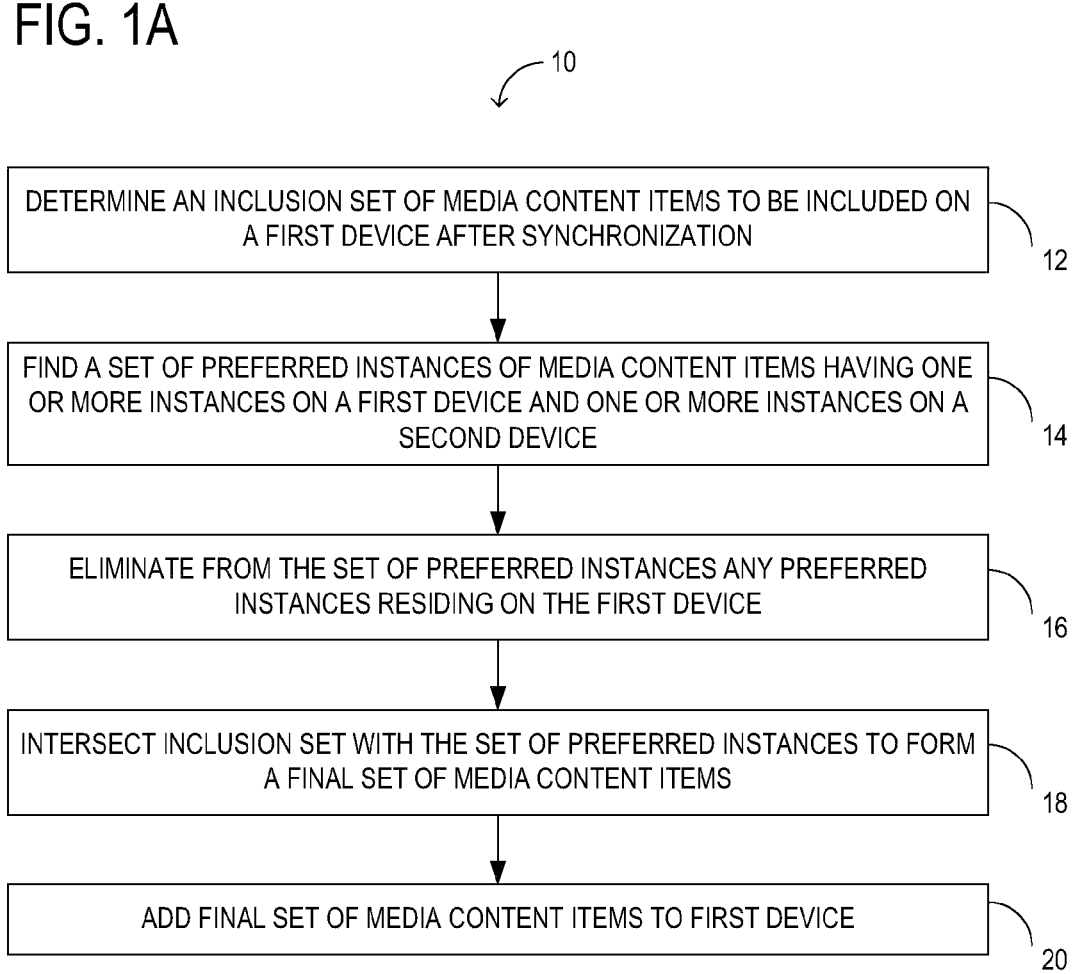
FIG. 1A shows a flow diagram of a method of synchronizing a plurality of media content items between two devices.

FIG. 1A shows a method 10 of synchronizing a plurality of media content items between a first device and a second device. Media content items may include, for example, digital audio, digital video, digital images, games, ringtones, and the like. An example of a media content item may include a specific audio track corresponding to a song on a given album by a given artist. Additionally, it may be possible for the same media content item to exist in one or more instances, where each instance has different instance attributes. As an example, the same song may exist in multiple instances, where the instances are differentiated by attributes such as lack or presence of digital rights restrictions, bitrate, etc.

Such instance attributes associated with a media content item may include, but are not limited to, file type, encoding format, bitrate, file protection, file size, and file restrictions. For example, in the aforementioned audio track example, multiple instances of this audio track may exist, such as a WMA track with digital rights restrictions, or an unprotected MP3 track ripped directly from a CD.

Method 10 can be used to synchronize such media content items between a first device and a second device. In some embodiments, method 10 may include synchronization between a portable media player and a content library, where the content library could be another portable media player, a personal computer, a network-accessible content server, or another suitable device.

Method 10 may be a component in a larger synchronization process. Such a larger synchronization process may include, for example, adding media content items that are not yet on the first device, deleting media content items that are on the first device but are not to remain on the first device after synchronization, and updating the metadata for media content items that are on both the first and second devices. Furthermore, method 10 may be part of a bi-directional synchronization process.

Method 10 at 12 includes determining an inclusion set of media content items to be included on the first device after synchronization. The inclusion set includes media content items to be transferred from the second device to the first device, as well as any media content items already existing on the first device that are to remain on the first device. Any media content items already existing on the first device that are not in the inclusion set may be deleted from the first device, as described in more detail as follows, to yield a first device including the media content items in the inclusion set.

The inclusion set may be determined in any suitable manner. In some embodiments the inclusion set may be determined by a user indicating that only a certain type of media content items are to be synchronized. For example, in the audio track example discussed above, the inclusion set may include only audio tracks of a specific music genre. In such an example, the inclusion set includes the audio tracks of that music genre to be transferred from the second device to the first device, as well as the audio tracks existing on the first device that are to remain on the first device after synchronization. Audio tracks of music genres other than the genre specified by the inclusion set may be deleted as part of the synchronization process. In other scenarios, an inclusion set may be based off of virtually any other selection criteria. Nonlimiting examples of such selection criteria include highest rated content items, highest recommended content items, most played content items, most recently acquired content items, content items from a same artist/author/publisher, content items from a same time period, content items belonging to a user-selected playlist, and content items belonging to a machine-selected playlist, among others.

Method 10 at 14 includes finding a set of preferred instances of media content items having one or more instances on the first device and one or more instances on the second device. Any suitable approach may be used for finding the set of preferred instances. In some embodiments, such a suitable approach may include method 30 as shown in FIG. 2, and described as follows.

Figure 2:
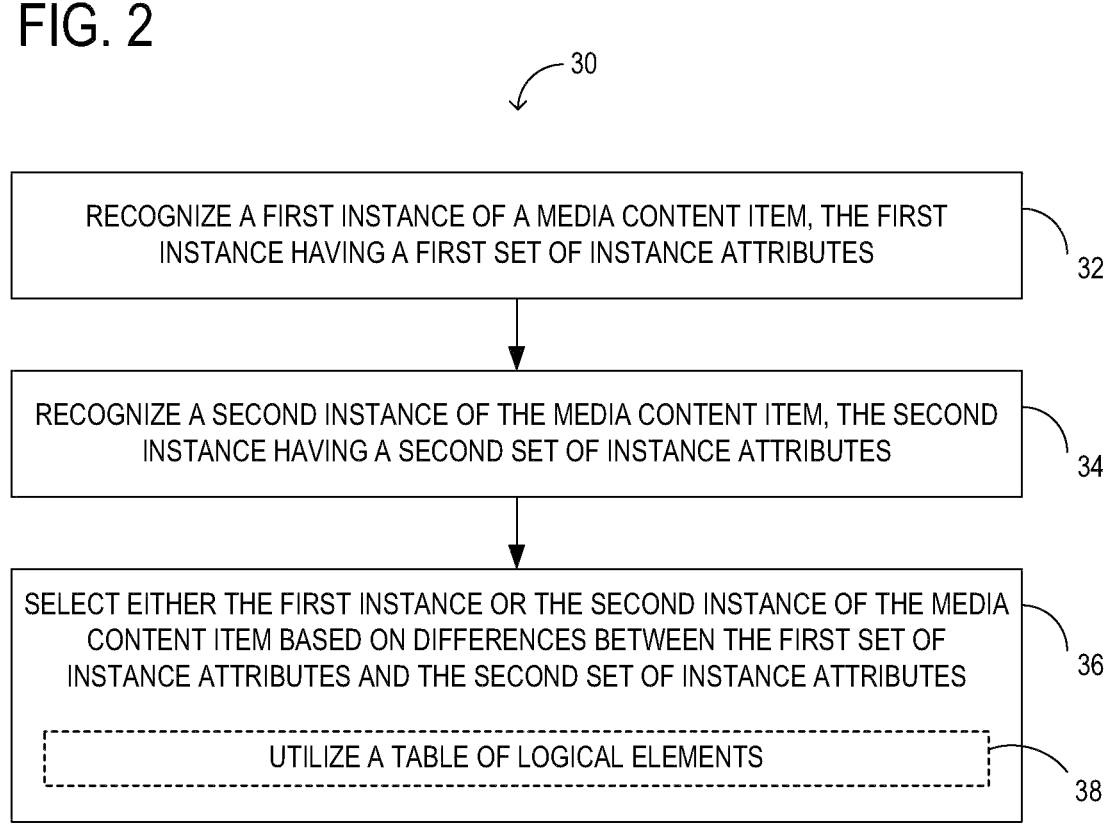
FIG. 2 shows a method of finding a preferred instance of a media content item having two or more different instances.

FIG. 2 shows a method 30 of finding a preferred instance of a media content item having two or more different instances. Method 30 at 32 includes recognizing a first instance of the media content item having a first set of instance attributes. Method 30 at 34 includes recognizing a second instance of the media content item having a second set of instance attributes.

Any suitable method may be used for recognizing instances of media content. In some embodiments, such a suitable method may include utilizing a database and/or the Internet to identify instances of media content items by service media identification codes or other identifiers used to identify different instances of a media content item. In other embodiments, a comparison algorithm utilizing the metadata corresponding to each media content item may be used to recognize instances of the media content item.

Upon recognizing a first and second instance of a media content item, method 30 at 36 includes selecting either the first or second instance based on differences between the first and second sets of instance attributes.

For example, when two or more instances of a media content item exist, one instance may be preferable or desirable over another instance, for reasons such as storage limitations or data-transferring limitations. In some cases, a user might belong to a subscription or music-sharing service that may provide the user with suggested time-limited media content items or protected media content items. At some point such a user may obtain another instance of the same content item with more desirable attributes, for example an instance without time limitations or content protection. In such a case, the user may want to ensure that this desirable instance is utilized, rather than a less desirable instance of the same content, when performing a synchronization process. Thus, either the first instance or the second instance of the media content may be selected based on differences between the sets of instance attributes.

In some embodiments, method 30 may include utilizing a table of logical elements to select one of the instances based on instance attributes, as shown at 38. Such a table of elements establishes a hierarchy of instance attributes by indicating if an instance of a media content item having one attribute should be chosen over another instance of that same media content item having a different attribute.

In some embodiments the table of logical elements may be a two-dimensional matrix. FIG. 3 shows an exemplary configuration of a matrix 40, which may be used to compare two instances of the same media content item, where the media content item has four possible instance attributes, namely ATT. 1, ATT. 2, ATT. 3, and ATT. 4. The logical elements in the matrix are denoted by "TRUE" or "FALSE."

The two-dimensional matrix is configured such that a first dimension includes a set of columns where each column corresponds to each instance attribute of a set of possible instance attributes. An exemplary column 42 is denoted in FIG. 3 with a dotted-line, corresponding to instance attribute ATT. 1. Likewise, the matrix is also configured such that a second dimension includes a set of rows where each row corresponds to each instance attribute of the set of possible instance attributes. Correspondingly, FIG. 3 also shows an exemplary row 44 denoted with a dotted-line, corresponding to attribute ATT. 3.

In such a matrix, the intersection of a row and a column defines an entry in the matrix. Each entry is a logical element indicating if a first instance of a media content item having a first instance attribute with which the column corresponds, is to be selected over a second instance of the media content item having a second instance attribute with which the row corresponds. For the exemplary configuration shown in FIG. 3, the logical element 46 enclosed by the intersection of the dotted column and row, indicates that a first instance of the media content having instance attribute ATT. 1 is to be chosen over a second instance of that same media content item having instance attribute ATT. 3.

As an example, returning to the audio track example described earlier, a first instance of an audio track may exist that has an instance attribute of being clear of rights-management restrictions. A second instance of that same audio track may also exist, where the second instance has an instance attribute of being protected, i.e., the track has some type of rights-management (e.g., copy protection). FIG. 4 depicts an exemplary configuration for a matrix 50 corresponding to such an example. As shown in FIG. 4, a matrix element 52 corresponding to the intersection of a "CLEAR" column 54 and a "PROTECTED" row 56, enclosed by a bold-line box, shows a logical element of "TRUE," indicating that the clear track is to be selected over the protected track.

In other embodiments the table of logical elements may be a two-dimensional matrix configured for combinations of instance attributes, as shown in the exemplary configuration shown in FIG. 5. In such a matrix 60, each column corresponds to a combination of two or more instance attributes of a set of possible instance attributes. As shown in the exemplary case in FIG. 5, column 62 corresponds to combination of three instance attributes, namely attributes ATT. 1, 2 and 3. Likewise, each row in such a matrix corresponds to a combination of two or more instance attributes of the set of possible instance attributes. As shown in the exemplary case in FIG. 5, row 64 corresponds to combination of two instance attributes, namely attributes ATT. 1 and 4. The matrix element 66 corresponding to the intersection of the "ATT. 1, 2, 3" column and the "ATT. 1, 4" row, enclosed by a bold-line box, shows a logical element of "TRUE," indicating that the instance of the media content item having attributes ATT. 1, 2 and 3 is to be chosen over the other instance of that same media content item having attributes ATT. 1 and 4.

In such embodiments, the matrix could be used, for example, in selecting a protected, full-length track over a clear, fixed-length promotional clip of a track, as shown in FIG. 6. It is to be understood that the number of columns and rows can be expanded to account for all the different possible combinations of instance attributes.

In some embodiments selecting either the first or second instance of the media content item based on differences between the instance attributes may include utilizing a set of user-defined rules. In such embodiments the user-defined rules may indicate, for example, a user preference of a particular instance attribute over another. For example, a user may indicate (e.g., via a graphical user interface) that audio encoded at 128 kbps is preferred over audio encoded at 256 kbps. Such preferences may be indicated for all related attributes, thus establishing user-defined rules that may be used to select one instance of a media content item over another instance of the same media content item.

In some embodiments, the first instance of the media content item may be replaced with the second instance of the media content item if the second instance is selected (e.g., at 36 of method 30).

In some embodiments, an instance of a media content item on one device may be selected over other instances residing on the same device, and unselected instances of the media content item may optionally be deleted. In some embodiments, an instance of a media content item on one device may be selected over other instances residing on other devices, and the selected instance of the media content item may be synchronized between such devices.

Returning to FIG. 1A, upon finding a set of preferred instances method 10 at 16 includes eliminating from the set of preferred instances of media content items any preferred instances residing on the first device. Thus, it can be seen that after performing such an elimination, the set of preferred instances may include only the preferred instances on the second device. As explained below, this step saves extra copies of the same content item being moved to the first device when such content items already exist on the first device.

Method 10 further includes, at 18, intersecting the inclusion set of media content items with the set of preferred instances of media content items to form a final set of media content items. As described with reference to FIG. 1B, this may be done prior to finding a set of preferred instances in some embodiments. By doing such an intersection, any preferred instances corresponding to media content items not in the inclusion set of media content items are eliminated. A graphical depiction 70 of constructing a final set from the intersection of an inclusion set and a set of preferred instances is shown in FIG. 7. In such an exemplary case, an inclusion set 72 contains three media content items, namely Media Content Items 1, 2 and 5. However, a set of preferred instances 74 contains media content items in excess of those in the inclusion set 72. By intersecting the inclusion set 72 with the set of preferred instances 74, the instances of Media Content Items 3, 4 and 6 are eliminated. Thus, the intersection picks out just those preferred instances corresponding to media content items in the inclusion set, namely Media Content Item 1 Instance 1, Media Content Item 2 Instance 1, and Media Content Item 5 Instance 2, to be included in the final set 76.

Turning back to FIG. 1A, upon forming the final set of media content items, method 10 at 20 includes adding the final set of media content items to the first device. As used herein, "adding the final set of media content items" may include transferring new media content items from the second device to the first device, upgrading instances of media content items on the first device by keeping a preferred instance from two or more instances already existing on the first device, and/or by transferring a preferred instance from the second device to the first device.

In some embodiments, a synchronization process may be extended by deleting from the first device any media content items not in the inclusion set of media content items and/or by deleting from the first device any instances of a media content item having a corresponding preferred instance of that media content item in the preferred set of media content items. In such embodiments, the first device may include only those media content items in the inclusion set after such content items have been deleted and all content items from the final set have been added. Using the methods described, media content items to be added may be determined by identifying a remainder set of media content items (i.e., media content items that are not yet on the first device) by subtracting the set of media content items on the first device from the inclusion set of media content items. Likewise, media content items to be deleted may be determined by identifying another remainder set of media content items (i.e., media content items that are no longer to be included on the first device) by subtracting the inclusion set of media content items from the set of media content items on the first device.

Figure 1B:
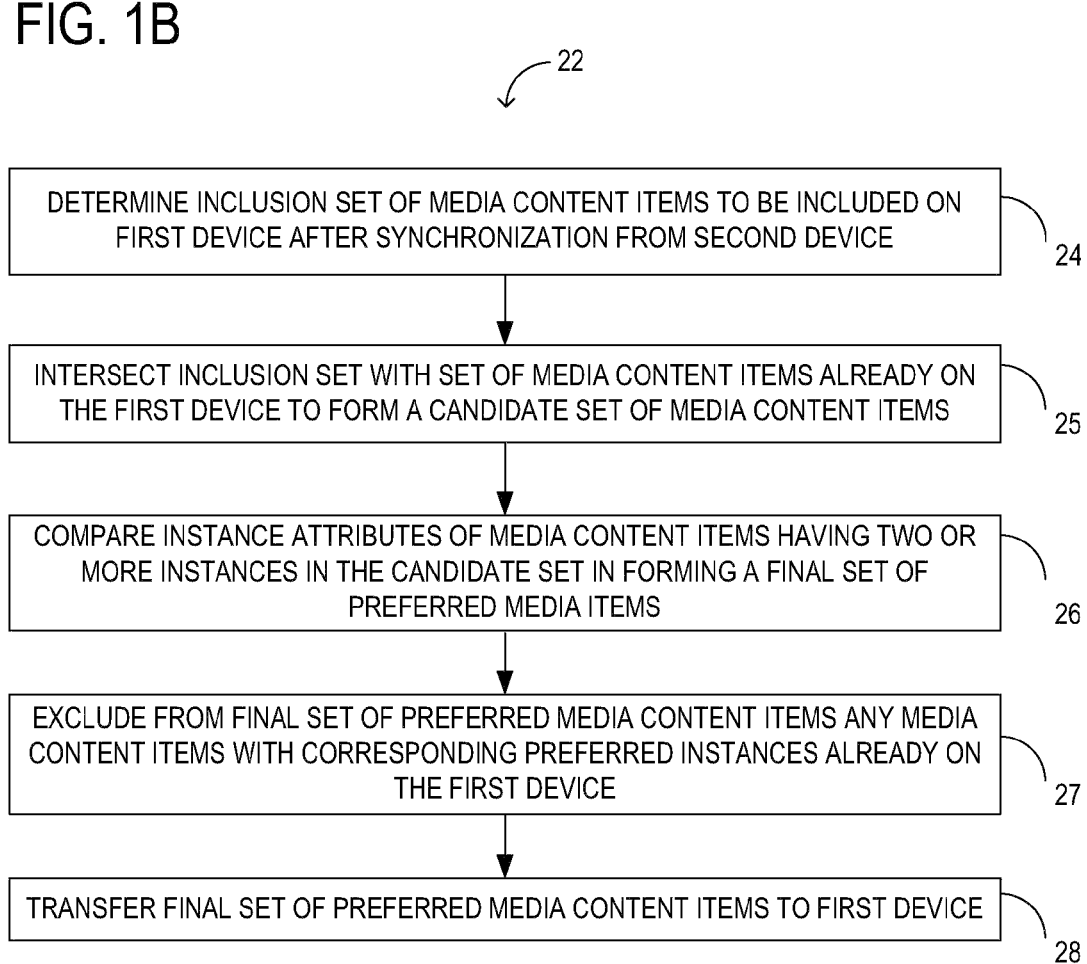
FIG. 1B shows another flow diagram of a method of synchronizing a plurality of media content items between two devices.

FIG. 1B shows another method 22 of synchronizing a plurality of media content items between a first device and a second device. At 24, method 22 includes determining an inclusion set of media content items to be included on a first device after synchronization from a second device. Media content items in the inclusion set may originate on the first device or the second device.

FIG. 8 shows one example of method 22 of synchronizing a first device 82 with a second device 84. As shown in FIG. 8, inclusion set 86 includes media content items 1-4, which are the media content items to reside on the first device 82 after synchronization. As described above, media content items in the inclusion set may originate on the first device or the second device. As shown in FIG. 8, inclusion set 86 includes media content items 1 and 3 from first device 82, and media content items 1-4 from second device 84.

Returning to FIG. 1B at 25, method 22 includes intersecting the inclusion set with the set of media content items that are already on the first device to form a candidate set of media content items. Such an intersection creates a candidate set of media content items containing only those media content items in the inclusion set which reside on both the first and second devices.

FIG. 8 shows such an intersection, for inclusion set 86 with first device 82. The intersection selects media content items having two or more instances in inclusion set 86. In the example shown in FIG. 8, media content item 1 and media content item 3 each have two instances. Thus, candidate set 88 formed by the intersection includes a pair of instances of media content item 1 and a pair of instances of media content item 3, where each pair includes one instance on a first device 82 and one instance on a second device 84.

Returning to FIG. 1B at 26, method 22 includes comparing instance attributes for the media content items having two or more instances in the candidate set of media content items in forming a final set of preferred media content items. Such a comparison allows for selection of a preferred instance of each media content item.

FIG. 8 shows such a comparison for the media content items in candidate set 88. As shown, media content item 1 from first device 82, and media content item 3 from second device 84 are selected to be preferred instances, and these instances are included in the final set 90.

Returning to FIG. 1B at 27 method 22 includes excluding from the final set of preferred media content items any media content items with corresponding preferred instances already on the first device. Therefore the media content items remaining in the final set are just those media content items needing to be transferred from the second device to the first device.

FIG. 8 shows such an exclusion of a media content item from final set 90 that is already on first device 82, namely media content item 1. Thus, final set 90 includes only one item on second device 84 to be transferred to first device 82, namely media content item 3.

Returning to FIG. 1B at 28, method 22 includes transferring the final set of preferred media items to the first device.

Method 22 may further include deleting from the first device any media content items not in the inclusion set of media content items. For example, in the case illustrated in FIG. 8, first device 82 includes a media content item 6 which is not part of inclusion set 86 and therefore is not to be on first device 82 after synchronization. Thus, media content item 6 is to be removed from first device 82.

Method 22 may also further include transferring all items in the inclusion set that are not in the candidate set or on the first device. For example, in the case illustrated in FIG. 8, inclusion set 86 includes media content items 2 and 4 that are not in candidate set 88 or on first device 82. Thus, media content items 2 and 4 are to be transferred from second device 84 to first device 82.

Since both method 22 and method 10 are methods of synchronizing a plurality of media content items between a first device and a second device, examples discussed above with reference to method 10 are nonlimiting, and therefore may likewise be examples for method 22, and vice versa.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of synchronizing a plurality of media content items between a first device and a second device, the method comprising:
   determining an inclusion set of media content items to be included on the first device after synchronization from the second device;
   intersecting the inclusion set with a set of media content items already on the first device to form a candidate set of media content items, wherein the candidate set of media content items includes only those media content items in the inclusion set that reside on both the first device and the second device;
   forming a set of preferred media content items including a preferred encoding instance of any media content item in the candidate set of media content items having two or more instances with different encodings, the preferred encoding instance selected based on a comparison of instance attributes of media content items that utilizes a table of logical elements, the table of logical elements establishing a hierarchy of a plurality of instance attributes including encoding instances, where the table of logical elements is a two-dimensional matrix including a first dimension including a set of columns, each column corresponding to an instance attribute of a set of possible instance attributes, and a second dimension including a set of rows, each row corresponding to an instance attribute of the set of possible instance attributes;
   forming a final set of media content items by excluding from the set of preferred media content items the preferred encoding instance of any media content item for which the preferred encoding instance is already on the first device; and
   transferring the final set of media content items to the first device.

2. The method of claim 1, further comprising deleting from the first device any media content items not in the inclusion set of media content items.

3. The method of claim 1, further comprising transferring to the first device all media content items in the inclusion set that are not in the candidate set and are not already on the first device.

4. The method of claim 1, where the first device is a portable media player and the second device is a personal computer.

5. The method of claim 1, where the first device is a portable media player and the second device is a network-accessible server.

6. The method of claim 1, where the first device is a first portable media player and the second device is a second portable media player.

7. The method of claim 1, wherein the plurality of media content items are selected from a group including digital audio, digital video, digital images, games, and ringtones.

8. The method of claim 1, wherein the plurality of instance attributes are selected from a group including file type, encoding format, bitrate, file protection, file size, and file restrictions.

9. The method of claim 1, wherein the hierarchy of the plurality of instance attributes utilized to select the preferred encoding instance is based on user preference.

10. The method of claim 1, wherein the hierarchy of the plurality of instance attributes utilized to select the preferred encoding instance is based on selection criteria.

11. The method of claim 10, wherein the selection criteria include an instance attribute profile matching instance attributes of one or more of highest rated content items, highest recommended content items, most played content items, most recently acquired content items, content items from a same artist/author/publisher, content items from a same time period, content items belonging to a user-selected playlist, and content items belonging to a machine-selected playlist.

12. The method of claim 1, wherein each column corresponds to a combination of two or more instance attributes of the set of possible instance attributes, each row corresponds to a combination of two or more instance attributes of the set of possible instance attributes, and the preferred encoding instance is selected based on a preferred combination of two or more instance attributes.

* * * * *